United States Patent [19]
Suzuki et al.

[11] Patent Number: 5,874,518
[45] Date of Patent: Feb. 23, 1999

[54] EPOXY-MODIFIED POLYAMIDE RESIN

[75] Inventors: Kenji Suzuki, Hitachi; Yoshiyuki Mukoyama, Chiba; Toshihiko Ito, Ibaraki-ken, all of Japan

[73] Assignee: Hitachi Chemical Company, Ltd., Tokyo, Japan

[21] Appl. No.: 275,270

[22] Filed: Jul. 15, 1994

[30] Foreign Application Priority Data

Jul. 20, 1993 [JP] Japan ................................. 5-178954

[51] Int. Cl.$^6$ ................................................ C08G 73/10
[52] U.S. Cl. ........................ 528/310; 528/49; 528/59; 528/272; 528/274; 528/296; 528/322; 528/332; 528/335; 528/336; 525/418; 525/419; 525/423
[58] Field of Search .......................... 528/59, 49, 272, 528/274, 296, 310, 332, 322, 335, 336; 525/418, 419, 423

[56] References Cited

U.S. PATENT DOCUMENTS 5,095,058  3/1992  Smith et al. .......................... 524/238

FOREIGN PATENT DOCUMENTS

| 0 275 988 | 7/1988 | European Pat. Off. . |
| 0 295 906 | 12/1988 | European Pat. Off. . |
| 0 612 781 | 8/1994 | European Pat. Off. . |
| 05051447 | 3/1993 | Japan . |
| 05295081 | 11/1993 | Japan .......................... C08G 59/14 |

OTHER PUBLICATIONS

Chemical Abstracts, vol. 116, No. 4, 27 Jan. 1992, Columbus, Ohio, US; Abstract No. 22449.

Chemical Abstracts, vol. 110, No. 18, 1 May 1989, Columbus, Ohio, US; Abstract No. 155790.

Database WPI, Week 8910, Derwent Publications Ltd. London, GB AN 89–072683.

Patent Abstracts of Japan, vol. 17, No. 361 (C–1080), 8 Jul. 1993.

*Primary Examiner*—P. Hampton-Hightower
*Attorney, Agent, or Firm*—Antonelli, Terry, Stout & Kraus, LLP

[57] ABSTRACT

An epoxy-modified polyamide resin obtained by reacting a diisocyanate(A) with at least one member selected from the group consisting of a dicarboxylic acid and a tricarboxylic acid anhydride (B) in a nitrogen-containing aprotic solvent to form a polyamide resin intermediate and reacting this polyamide resin intermediate with an epoxy resin (C) in the nitrogen-containing aprotic solvent. This epoxy-modified polyamide resin has a high molecular weight and can provide a film with excellent heat resistance and flexibility, and its composition can be used as a coating material, adhesive or such in the form as it is.

28 Claims, No Drawings

EPOXY-MODIFIED POLYAMIDE RESIN

BACKGROUND OF THE INVENTION

The present invention relates to a process for preparing epoxy-modified polyamide resins, the epoxy-modified polyamide resins obtained from the process, and the epoxy-modified polyamide resin films.

Polyamide resins have high polarity and strong hydrogen bond with a high bond energy between the nitrogen and carbon atoms in the amide linkage, so that they are excellent in heat resistance and widely used for applications where heat resistance is required.

As means for the preparation of such polyamide resins, a method is known in which a diisocyanate and a dicarboxylic acid and/or a tricarboxylic anhydride are subjected to carbon dioxide gas elimination polymerization in a nitrogen-containing aprotic solvent. The produced polymerization solution can be put to use as a paint, adhesive or such in the form as it is. According to this method, however, it is difficult to obtain polyamide resins of high molecular weight, and the obtained polyamide resins are not always satisfactory in their film properties, especially flexibility.

In Japanese Patent Unexamined Publication (JP-A) Nos. 5-51447, 5-230169, 5-51571 and 5-230430, there is disclosed a process for preparing an epoxy-modified polyamide resin by removing a nitrogen-containing aprotic solvent from a polyamide resin solution prepared by a known method, purifying the polyamide resin, dissolving it in a nitrogen-free aprotic solvent again, followed by reacting with an epoxy resin.

Further, in JP-A No. 2-22319, there is disclosed a process for preparing an epoxy-modified polyamide resin without using a solvent.

However, the obtained epoxy-modified polyamide resins are not always satisfactory in their heat resistance.

Further, since the process described in the JP-A Nos. 5-51447, 5-230169, 5-51571 and 5-230430 includes the step of removing a nitrogen-containing aprotic solvent from a polyamide resin solution and the step of dissolving it in a nitrogen-free aprotic solvent again, this process is placed at a disadvantage in respect of the cost for manufacturing the epoxy-modified polyamide resin.

SUMMARY OF THE INVENTION

The present invention has for its object to provide a process for preparing epoxy-modified polyamide resins which have a high molecular weight and can produce a film with excellent heat resistance and flexibility and whose composition can be used as a coating material, adhesive or such in the form as it is, the epoxy-modified polyamide resins obtained from the above process, and the epoxy-modified polyamide resin films.

The present invention provides a process for preparing a polyamide resin with a high molecular weight by first forming an epoxy-modified polyamide resin intermediate with a relatively low molecular weight from carbon dioxide gas elimination polymerization of a diisocyanate (A) and a dicarboxylic acid and/or a tricarboxylic anhydride (B) in a nitrogen-containing aprotic solvent, and reacting the intermediate with an epoxy resin (C) in the nitrogen-containing aprotic solvent. The present invention also provides the epoxy-modified polyamide resins obtained from this process and the films produced by using such epoxy-modified polyamide resins.

DESCRIPTION OF THE PREFERRED EMBODIMENTS

According to the present invention, a diisocyanate (A) and a dicarboxylic acid and/or a tricarboxylic anhydride (B) are reacted in a nitrogen-containing aprotic solvent to form a polyamide resin intermediate, and this intermediate is further reacted with an epoxy resin (C) in the nitrogen-containing aprotic solvent to produce an epoxy-modified polyamide resin.

The present invention also relates to the epoxy-modified polyamide resins that can be obtained from the above process.

The present invention further pertains to the epoxy-modified polyamide resin films produced by using said epoxy-modified polyamide resins.

The diisocyantes (A) usable in this invention are not specified. There can be used, for example, aromatic diisocyanates such as 4,4'-diphenylmethane diisocyanate, 2,4-tolylenediisocyanate, 2,6-tolylene diisocyanate, 1,5-naphthalenediisocyanate, 3,3'-dimethyl-4,4'-diphenylmethane diisocyanate,3,3'-dichloro-4,4'-diphenylmethane diisocyanate, p-phenylene diisocyanate, m-xylylene diisocyanate and m-tetramethylxylylene diisocyanate, and aliphatic diisocyanates such as hexamethylene diisocyanate, 2,2,4-trimethylhexamethylene diisocyanate, 2,4,4-trimethylhexamethylene diisocyanate, isophorone diisocyanate, 4,4'-dicyclohexylmethane diisocyanate, transcyclohexane-1,4-diisocyanate, hydrogenated m-xylylene diisocyanate and lysine diisocyanate. Of these diisocyanates, aromatic diisocyanates are preferred in view of high reactivity with the reaction partner dicarboxylic acid and/or tricarboxylic anhydride (B) and impartation of high heat resistance to the produced polyamide resin. Of the aromatic diisocyantes, 4,4'-diphenylmethane diisocyanate is especially preferred. These diisocyanates can be used either singly or as a mixture.

The dicarboxylic acids and/or tricarboxylic anhydrides (B) usable in this invention are also not specified. Examples thereof are aliphatic dicarboxylic acids such as succinic acid, glutaric acid, adipic acid, azelaic acid, pimelic acid, sebacic acid, dodecanedioic acid and dimer acid; aromatic dicarboxylic acids such as isophthalic acid, terephthalic acid, phthalic acid and naphthalene dicarboxylic acid; and aromatic tricarboxylic anhydrides such as trimellitic anhydride. These acids and acid anhydrides can be used either singly or as a mixture. Of these dicarboxylic acids and/or tricarboxylic anhydrides, aliphatic dicarboxylic acids are preferred in view of high reactivity with the reaction partner diisocyanate (A), good solubility in the nitrogen-containing aprotic solvent used as reaction solvent and impartation of high solubility in the nitrogen-containing aprotic solvents to the produced polyamide resin.

On the other hand, from the viewpoint of imparting high heat resistance to the polyamide resins, the use of aromatic dicarboxylic acids and aromatic tricarboxylic anhydrides is preferable. Further, considering the balance of solubility and heat resistance, a combined use of aliphatic dicarboxylic acids and aromatic dicarboxylic acids and/or aromatic tricarboxylic anhydrides is more preferable.

The aliphatic dicarboxylic acids, the aromatic dicarboxylic acids and the aromatic tricarboxylic anhydrides can be used singly or as a mixture thereof, respectively.

The nitrogen-containing aprotic solvents usable in this invention are not specified. There can be used, for example, amide type solvents such as N-methyl-2-pyrrolidone, N,N-dimethylacetamide and N,N-dimethylformamide, and urea type solvents such as N,N'-dimethylethyleneurea, N,N'-dimethylpropyleneurea and tetramethylurea. Of these solvents, amide type solvents are preferred because of excellent reaction accelerating action in the reaction of diisocyanate (A) and dicarboxylic acid and/or tricarboxylic anhydride (B) and high solvency for these reactants and for the produced polyamide resin. Of the amide type solvents, N-methyl-2-pyrrolidone is especially preferred. These solvents may be used either singly or as a mixture.

The amount of the nitrogen-containing aprotic solvent used for the reaction is preferably 50 to 2,000 parts by weight, more preferably 100 to 800 parts by weight, even more preferably 200 to 400 parts by weight, to 100 parts by weight of the total of the components (A) and (B) in view of solubility of these components (A) and (B) in the solvent, smooth reaction and other factors.

To a nitrogen-containing aprotic solvent such as mentioned above, there can be added where necessary other types of solvent which don't impede the reaction of diisocyanate (A) and dicarboxylic acid and/or tridcarboxylic anhydride (B), for example, aliphatic esters such as ethyl acetate and n-butyl acetate, aliphatic ketones such as methyl ethyl ketone and methyl isobutyl ketone, and aromatic hydrocarbons such as toluene and xylene.

The diisocyanate (A) to dicarboxylic acid and/or tricarboxylic anhydride (B) mixing ratio is not critical, but it is desirable that their molar ratio (B)/(A) is in the range of 1/1–2/1, more preferably in the range of 1/1–1.6/1, particularly preferably in the range of 1.05/1–1.3/1. When the molar ratio (B)/(A) is less than 1, since the amount of the diisocyanate (A) becomes excess over the amount of the dicarboxylic acid and/or tricarboxylic anhydride (B), there tend to occur the side reactions such as the reaction of the isocyanate groups with the nitrogen-containing aprotic solvent and the reversible dimerization reaction (uretidion forming reaction) and/or the irreversible trimerization reaction (isocyanurate forming reaction) between the isocyanate groups, with the nitrogen-containing aprotic solvent acting as an accelerator of such reactions. On the other hand, when the molar ratio (B)/(A) exceeds 2, part of the dicarboxylic acid and/or tricarboxylic anhydride (B) tends to remain unreacted.

The reaction (carbon dioxide gas elimination polymerization) of diisocyante (A) with dicarboxylic acid and/or tricarboxylic anhydride.(B) in a nitrogen-containing aprotic solvent for obtaining a polyamide resin intermediate is carried out at a temperature in the range of 80° to 250° C., preferably 100° to 200° C. (It is desirable that the reaction is conducted in a substantially anhydrous state.) A catalyst may be used as desired for the reaction. The catalysts usable here are not specified, but it is desirable to use a catalyst which can serve as a catalyst for the ensuing reaction of the polyamide resin intermediate with an epoxy resin (C).

Examples of the pertinent catalysts include organic acid metal salts such as dibutyltin dilaurate, 1,3-diacetoxytetrabutyldistannoxane, sodium benzoate and potassium benzoate; inorganic salts such as zinc chloride, iron chloride, lithium chloride and lithium bromide; metallic carbonyls such as octacarbonyl cobalt (II) (cobalt carbonyl); phosphorus compounds such as 3-methyl-1-phenyl-2-phosphorene-1-oxide; tertiary amines such as triethylamine, triethylenediamine, N,N-dimethylaniline, N,N-diethylaniline, N,N-dimethyl-benzylamine, N-methylmorpholine, N-ethylmorpholine, N,N'-dimethylpiperazine, pyridine, picoline and 1,8-diazabicyclo [5.4.0]undec-7-ene; quaternary ammonium salts such as tetraethylammonium bromide, tetrabutyl-ammonium bromide, benzyltriethylammonium chloride, trioctylmethylammonium chloride, cetyltrimethylammonium bromide, tetrabutylammonium iodide, dodecyltrimethylammonium iodide and benzyldimethyltetradecylammonium acetate; quaternary phosphonium salts such as tetraphenylphosphonium chloride, triphenylmethylphosphonium chloride and tetramethylphosphonium bromide; and imidazole compounds such as 2-methylimidazole, 2-ethylimidazole, 2-ethyl-4-methylimidazole, 2-methyl-4-methylimidazole, 1-cyanoethyl-2-methylimidazole, 1-cyanoethyl-2-phenylimidazole, 2-phenyl-4-methyl-5-hydroxymethylimidazole, 2-phenyl-4,5-dihydroxylmethylimidazole and 1-azine-2-methylimidazole. Of these catalysts, tertiary amines, quaternary ammonium salts and imidazole compounds are preferred. In case of using a catalyst, it is preferably added all at one time or in portions to the reaction system in the last phase of polymerization reaction for completing the reaction. The amount of the catalyst added is 10 mol % or less based on the dicarboxylic acid and/or tricarboxylic anhydride (B). These catalysts may be used either singly or as a mixture.

The epoxy resin (C) used in the present invention needs to be one having two or more epoxy groups in the molecule but is not otherwise specified. It may be saturated or unsaturated aliphatic, alicyclic, aromatic or heterocyclic resin and may have substituents such as hydroxyl group, halogen atom, etc. Exemplary of such epoxy resins (C) are aromatic glycidyl ether compounds such as 4,4'-isopropylidenebisphenol diglycidyl ether (bisphenol A type), 4,4'-methylenebisphenol glycidyl ether (bisphenol F type), 2,6,2',6'-tetrabromo-4,4'-isopropylidenebisphenol diglycidyl ether (brominated bisphenol A type), phenolic novolac type polyglycidyl ether and orthocresolnovolac type polyglycidyl ether; aliphatic glycidyl ether compounds such as ethylene glycol diglycidyl ether, polyethylene glycol diglycidyl ether, propylene glycoldiglycidyl ether, polypropylene glycol diglycidyl ether, neopentyl glycol diglycidyl ether, 1,6-hexanediol diglycidyl ether, glycerol diglycidyl ether, glycerol triglycidyl ether, trimethylolpropane diglycidyl ether, trimethylolpropane triglycidyl ether, hydrogenated bisphenol A type diglycidyl ether, sorbitol polyglycidyl ether and 2,2'-dibromo-neopentyl glycol diglycidyl ether; glycidyl ester compounds such as diglycidyl phthalate, diglycidyl tetrahydrophthalate and diglycidyl hexahydrophthalate; glycidylamine compounds such as N,N-diglycidylaniline, N,N,N',N'-tetraglycidyl-4,4'-diaminodiphenylmethane, 1,3-bis(N,N-diglycidylaminomethyl)cyclohexane and N,N,O-triglycidyl-p-aminophenol; alicyclic epoxy compounds such as alicyclic diepoxyacetal, alicyclic diepoxy adipate, alicyclic diepoxy carboxylate and vinyl-cyclohexene dioxide; and heterocyclic epoxy compounds such as diglycidyl hydantoin and triglycidyl isocyanurate.

Of these compounds, aromatic glycidyl ether compounds are preferred in view of impartation of high heat resistance to the produced epoxy-modified polyamide resin. Of the aromatic glycidyl ether compounds, inexpensive 4,4'-isopropylidenebisphenol diglycidyl ether (bisphenol A type) is especially preferred because of low production cost of the epoxy-modified polyamide resin. 2,6,2',6'-tetrabromo-4,4'-isopropylidene-bisphenol diglycidyl ether is preferred in terms of impartation of flame retardancy to the produced epoxy-modified polyamide resin. From the viewpoint of impartation of high solubility in the nitrogen-containing aprotic solvents to the produced epoxy-modified polyamide resin, aliphatic glycidyl ether compounds, especially diglycidyl ethers of glycols are preferred. These compounds may be used either singly or as a mixture.

With regard to the amount of the epoxy resin (C) to be used, for example, in the reaction of a polyamide resin intermediate synthesized by using dicarboxylic acid and/or tricarboxylic anhydride (B) in excess over diisocyanate (A) in molar ratio with an epoxy resin (C) having two epoxy groups in the molecule, said epoxy resin is preferably used in an amount 3 times or less by mole, more preferably 0.8–2.2 times by mole, even more preferably 0.9–1.1 times by mole the excess of dicarboxylic acid and/or tricarboxylic anhydride (B).

When said epoxy resin is used in amount more than 3 times by mole, said epoxy resin is easily retained as an unreacted material. If the reaction is promoted in order to decrease the unreacted material, an undesirable reaction between the unreacted material (epoxy resin) and a secondary hydroxy group produced by the reaction between a carboxyl group and an epoxy group proceeds. Therefore, three-dimensional crosslinking between molecules takes place, resulting in easily bringing about gelation of the reaction system. When an epoxy resin (C) is used in an amount roughly equimolar to the excess of dicarboxylic acid and/or tricarboxylic anhydride (B), the highest degree of polymerization in that system can be attained, and an epoxy-modified polyamide resin having the maximal molecular weight can be obtained.

When the molar ratio (B)/(A) is 1, an epoxy resin (C) is used in an amount of 6 moles or less, preferably 1.6–4.4 moles, more preferably 1.8–2.2 moles of an epoxy group in the epoxy resin (C) per mole of a measured remaining carboxyl group in a synthesized polyamide resin intermediate.

The reaction of polyamide resin intermediate with epoxy resin (C) is usually carried out at a temperature in the range of 50°–250° C., preferably 100°–200° C. Although this reaction temperature is not specifically defined, it is recommended to employ the same temperature as used for the synthesis of polyamide resin intermediate (reaction of (A) with (B)) as this allows consecutive execution of a series of synthesis reaction operations for the preparation of the epoxy-modified polyamide resin without changing the temperature.

Means for the addition of epoxy resin (C) to polyamide resin intermediate is not defined. For instance, in case the epoxy resin (C) is a liquid with a low viscosity, it may be added all at one time or in portions in the form as it is, or it may be added dropwise by using a dropping funnel or other suitable means. In case the epoxy resin (C) is a solid or a high-viscosity liquid, it may be dissolved in a nitrogen-containing aprotic solvent and/or other solvent which can be used jointly with a nitrogen-containing aprotic solvent, such as mentioned before, and the resulting solution may be applied in the same way as described above.

The amount of the nitrogen-containing aprotic solvent and/or other solvent which can be used jointly with a nitrogen-containing aprotic solvent is preferably 5 to 2,000 parts by weight, more preferably 20 to 500 parts by weight, even more preferably 50 to 200 parts by weight, per 100 parts by weight of the epoxy resin (C).

If necessary, a catalyst may be used for the reaction of polyamide resin intermediate with epoxy resin (C). The afore-mentioned carbon dioxide gas elimination reaction catalysts for the synthesis of polyamide resin intermediate can be employed for the above reaction. Of these catalysts, tertiary amines, quaternary ammonium salts and imidazole compounds are preferred. In case of using a catalyst for the above reaction, it is preferably added all at one time or in parts to the reaction system in the early phase of the reaction for promoting the reaction, its amount used is preferably 10 mol % or less based on the epoxy resin (C). If necessary, different types of catalyst may be used jointly. For controlling the molecular weight of the produced epoxy-modified polyamide resin, a known monofunctional compound such as monoepoxide, monoalcohol, monoamine, monoimine, monocarboxylic acid, dicarboxylic anhydride, water, etc., may be added to the reaction system.

It is desirable that the epoxy-modified polyamide resin obtained from the above-described process of the present invention has a number-average molecular weight of 10,000 or above in view of high heat resistance and flexibility of the film produced therefrom. It is to be noted, however, that too large a weight-average molecular weight leads to a reduction of solubility of the resin in a state of solution or an increase of solution viscosity, making it difficult to treat the resin solution, so that it is desirable that the weight-average molecular weight of the resin does not exceed 1,000,000.

The epoxy-modified polyamide resin composition obtained from the preparation process of the present invention can be used as a coating material, adhesive or such directly in the form of polymerization solution obtained from said process or after mixing therein various known compounds as desired.

The epoxy-modified polyamide resin film of the present invention can be produced by a known method from the epoxy-modified polyamide resin composition of the present invention.

In the following, the present invention is described in further detail with reference to Examples. The properties of the epoxy-modified polyamide resins and the films produced there from were evaluated by the methods described below.
Resin molecular weight distribution The molecular weight distribution curves were determined according to GPC method using a 1:1 (by volume) N,N-dimethylformamide and tetrahydrofuran mixed solvent containing lithium bromide monohydrate and phosphoric acid as eluants in concentrations of 0.03 mol/l and 0.06 mol/l, respectively, and the number-average molecular weight (Mn) and the weight-average molecular weight (Mw), reduced to polystyrene basis, were calculated from the calibration curves obtained by using polystyrene as standard substance.
Heat resistance of resin film The sample film was heated in the air at a rate of 10° C./min and the temperature (Td) at which the film suffered 5% weight loss was determined according to TGA method.
Flexibility of resin film The sample film was subjected to a 180° bending test and the number of times of bending (n) that the film could endure till it was cracked was determined.

EXAMPLE 1

Into a 0.5-liter separable flask equipped with a stirrer, a thermometer, a condenser and a nitrogen gas feed pipe, 27.50 g (0.110 mol) of 4,4'-diphenylmethane diisocyanate (MILLIONATE MT, a trade name, produced by Nippon Polyurethane Co., Ltd.), 5.78 g (0.040 mol) of adipic acid, 10.67 g (0.053 mol) of sebacic acid, 9.11 g (0.040 mol) of dodecanedioic acid and 210.0 g of N-methyl-2-pyrrolidone were supplied under a nitrogen atmosphere and heated to 130° C. The reaction system was brought into a state of homogeneous solution in the course of heating. After heated to 130° C., the mixture was further reacted at the same temperature for one hour and then at 170° C. for 2 hours to obtain a polyamide resin intermediate as a solution.

Into this polyamide resin intermediate solution kept at 170° C., a solution of 16.94 g (0.045 mol) of 4,4'- isopropylidenebisphenol diglycidyl ether (bisphenol A type, EPOMIK R140 produced by Mitsui Petrochemical Industries, Ltd.) in 30.0 g of N-methyl-2-pyrrolidone was added dropwise over a period of 5 minutes and the reaction was allowed to advance at the same temperature for 2 hours to produce an epoxy-modified polyamide resin composition.

This epoxy-modified polyamide resin composition was applied on a glass plate to a coating thickness of about 100 μm by an applicator and then subjected to drying and baking at 100° C. for one hour, then at 200° C. for 30 minutes and further at 250° C. for additional 30 minutes to form an epoxy-modified polyamide resin film with a thickness of about 20 μm.

EXAMPLE 2

Into the same synthesis apparatus as used in Example 1, 17.27 g (0.069 mol) of 4,4'-diphenylmethane diisocyanate (MILLIONATE MT produced by Nippon Polyurethane Kogyo KK), 6.05 g (0.041 mol) of adipic acid, 11.17 g (0.055 mol) of sebacic acid, 9.54 g (0.041 mol) of dodecanedioic acid and 290.0 g of N-methyl-2-pyrrolidone were supplied under a nitrogen atmosphere and heated to 130° C. The reaction system assumed a state of homogeneous solution in the course of heating. After heated to 130° C., the mixture was allowed to react at the same temperature for 30 minutes and then at 170° C. for one hour to obtain a solution of a polyamide resin intermediate.

Into this polyamide resin intermediate solution kept at 170° C., a solution of 29.0 g (0.077 mol) of 4,4'-isopropylidenebisphenol diglycidyl ether (bisphenol A type, EPOMIK R140 produced by Mitsui Petrochemical Industries, Ltd.) in 40.0 g of N-methyl-2-pyrrolidone was added dropwise over a period of 10 minutes, and the mixture was further reacted at the same temperature for 3 hours to produce an epoxy-modified polyamide resin composition.

This epoxy-modified polyamide resin composition was applied on a glass plate to a coating thickness of about 120 μm by an applicator and then subjected to drying and baking at 100° C. for one hour, then at 200° C. for 30 minutes and further at 250° C. for additional 30 minutes to form an approximately 20 μm thick epoxy-modified polyamide resin film.

COMPARATIVE EXAMPLE 1

Into the same synthesis apparatus as used in Example 1, 39.45 g (0.158 mol) of 4,4'-diphenylmethane diisocyanate (MILLIONATE MT produced by Nippon Polyurethane Co., Ltd.), 6.91 g (0.047 mol) of adipic acid, 12.75 g (0.063 mol) of sebacic acid, 10.89 g (0.047 mol) of dodecanedioic acid and 220.0 g of N-methyl-2-pyrrolidone were supplied under a nitrogen atmosphere and heated to 130° C. The reaction system assumed a state of homogeneous solution in the course of heating. After heated to 130° C., the mixture was reacted at the same temperature for 2 hours and further at 170° C. for 3 hours to produce a polyamide resin intermediate for comparison with the product of the present invention.

This comparative polyamide resin intermediate composition was applied on a glass plate to a coating thickness of about 100 μm by an applicator and subjected to drying and baking at 100° C. for one hour, then at 200° C. for 30 minutes and further at 250° C. for additional 30 minutes to make an approximately 20 μm thick polyamide resin intermediate film for comparison with the product of the present invention.

EXAMPLE 3

Into the same synthesis apparatus as used in Example 1, 62.49 g (0.250 mole) of 4,4'-diphenylmethane diisocyanate (MILLIONATE MT, a trade name, mfd. by Nippon Polymethane Co., Ltd.), 10.95 g (0.075 mole) of adipic acid, 15.15 g (0.075 mole) of sebacic acid, 24.89 g (0.150 mole) of isophthalic acid and 221.0 g of N-methyl-2-pyrrolidone were supplied under a nitrogen atmosphere and heated to 130° C. The reaction system became a uniform solution in the course of heating. After heated to 130° C., the reaction mixture was further reacted at the same temperature for 30 minutes and at 170° C. for 2 hours to yield a solution of polyamide resin intermediate.

To this polyamide resin intermediate solution kept at 170° C., a solution dissolving 38.49 g (0.102 mole) of 4,4'-isopropylidenebisphenol diglycidyl ether (bisphenol A type, EPOMIK R140 mfd. by Mitsui Petrochemical Industries, Ltd.) in 65 g of N-methyl-2-pyrrolidone was added and reacted at the same temperature for 2 hours, followed by cooling. When the temperature of the reaction system became 130° C., 104 g of N-methyl-2-pyrrolidone was added thereto to give an epoxy-modified polyamide resin composition.

This epoxy-modified polyamide resin composition was coated on an iron plate coated with tin with an applicator so as to give a film thickness of about 100 μm, followed by drying and baking at 100° C. for 1 hour, at 200° C. for 30 minutes and at 250° C. for 30 minutes to form an epoxy-modified polyamide resin film of about 20 μm thick.

EXAMPLE 4

Into the same synthesis apparatus as used in Example 1, 62.02 g (0.248 mole) of 4,4'-diphenylmethane diisocyanate (MILLIONATE MT, a trade name, mfd. by Nippon Polyurethane Co., Ltd.), 10.86 g (0.074 mole) of adipic acid, 15.03 g (0.074 mole) of sebacic acid, 18.53 g (0.112 mole) of isophthalic acid, 7.14 g (0.037 mole) of trimellitic anhydride, and 221.0 g of N-methyl-2-pyrrolidone were supplied under a nitrogen atmosphere and heated to 130° C. The reaction system became a uniform solution in the course of heating. After heated to 130° C., the reaction mixture was further reacted at the same temperature for 30 minutes and at 170° C. for 2 hours to yield a solution of polyamide resin intermediate.

To this polyamide resin intermediate solution kept at 170° C., a solution dissolving 38.21 g (0.102 mole) of 4,4'-isopropylidenebisphenol diglycidyl ether (bisphenol A type, EPOMIK R140 mfd. by Mitsui Petrochemical Industries, Ltd.) in 65 g of N-methyl-2-pyrrolidone was added and reacted at the same temperature for 2 hours, followed by cooling. When the temperature of the reaction system became 130° C., 104 g of N-methyl-2-pyrrolidone was added thereto to give an epoxy-modified polyamide resin composition.

This polyamide resin composition was coated on an iron plate coated with tin with an applicator so as to give a film thickness of about 100 μm, followed by drying and baking at 100° C. for 1 hour, at 200° C. for 30 minutes and at 250° C. for 30 minutes to form an epoxy-modified polyamide resin film of about 20 μm thick.

EXAMPLE 5

Into a 0.5-liter separable flask equipped with a stirrer, a thermometer, a cooling condenser, a nitrogen gas introducing pipe and a fractional distillation column, 52.87 g (0.211 mole) of 4,4'-diphenylmethane diisocyanate (MILLIONATE MT, a trade name, mfd. by Nippon Polyurethane Co., Ltd.), 11.11 g (0.076 mole) of adipic acid, 20.51 g (0.101 mole) of sebacic acid, 17.52 g (0.076 mole) of dodecandioic acid and 170.0 g of N-methyl-2-pyrrolidone were supplied under a nitrogen atmosphere and heated to 130° C. The reaction system became a uniform solution in the course of heating. After heated to 130° C., the reaction mixture was further reacted at the same temperature for 30 minutes and at 170° C. for 2 hours to yield a solution of polyamide resin intermediate.

Into a 0.1-liter separable flask equipped with a stirrer, a thermometer, and a cooling condenser, 14.72 g (0.085 mole) of 2,4-tolylene diisocyanate (CORONATE T-100, a trade name, mfd. by Nippon Polyurethane Co., Ltd.), 2.71 g (0.085 mole) of methanol and 20.0 g of methyl isobutyl ketone were supplied and stirred. The temperature of the reaction system was raised exothermically to about 50° C. After cooling the reaction system naturally to room temperature, the resulting half blocked isocyanate solution was added to the polyamide resin intermediate solution at room temperature. The resulting mixture was reacted at 130° C. for 2 hours to give a solution of polyamide resin intermediate blocked with isocyanates at both terminals.

To this polyamide resin intermediate solution kept at 120° C., a solution dissolving 32.57 g (0.087 mole) of 4,4'-isopropylidene bisphenol diglycidyl ether (bisphenol A type, EPOMIK R140P, a trade name, mfd. by Mitsui Petrochemical Industries, Ltd.) in 65 g N-methyl-2-pyrrolidone was added. Further, to the resulting mixture, 1 g of triethylamine was added 10 times with an interval of each 1 hour, and the reaction was carried out at 120° C. for 10 hours, and at 140° C. for 1 hour, while removing byproduced methanol by distillation out of the system, followed by cooling. When the temperature of the reaction system became 130° C., 104 g of N-methyl-2-pyrrolidone was added thereto to give an epoxy-modified polyamide resin composition.

This epoxy-modified polyamide resin composition was coated on an iron plate coated with tin with an applicator so as to give a film thickness of about 100 μm, followed by drying and baking at 100° C. for 1 hour, at 200° C. for 30 minutes and at 250° C. for 30 minutes to form an epoxy-modified polyamide resin film of about 20 μm thick.

The properties of the epoxy-modified polyamide resin compositions and the films made thereof obtained in Examples 1 to 5 and the Comparative Example are shown collectively in Table 1.

Further, since the "Td" of the above epoxy-modified polyamide resin compositions is higher by at least 15° C. than that of the comparative product which has excellent heat resistance, the above epoxy-modified polyamide resin compositions have a remarkably high level of heat resistance.

According to the present invention, there can be produced a high-molecular weight epoxy-modified polyamide resin that can be favorably applied to coating materials, adhesives and the like, and the films produced by using this epoxy-modified polyamide resin have excellent heat resistance and flexibility and find a wide scope of use.

What is claimed is:

1. A process for preparing a reaction product of a polyamide resin intermediate and an epoxy resin, which comprises reacting an aromatic diisocyanate (A) with at least one member (B) selected from the group consisting of a dicarboxylic acid and a tricarboxylic acid anhydride in a nitrogen-containing aprotic solvent to form a solution of a polyamide resin intermediate in a reactor and reacting said polyamide resin intermediate with an epoxy resin (C) using the same nitrogen-containing aprotic solvent in the same reactor.

2. A process for preparing a reaction product of a polyamide resin intermediate and an epoxy resin according to claim 1, wherein the component (B) is an aliphatic dicarboxylic acid.

3. A process for preparing a reaction product of a polyamide resin intermediate and an epoxy resin according to claim 1, wherein the component (B) is a mixture of at least one of an aliphatic dicarboxylic acid and an aromatic dicarboxylic acid, and an aromatic tricarboxylic anhydride.

4. A process for preparing a reaction product of a polyamide resin intermediate and an epoxy resin according to claim 1, wherein the nitrogen-containing aprotic solvent is N-methyl-2-pyrrolidone.

5. A reaction product of a polyamide resin intermediate and an epoxy resin obtained by the process set forth in claim 1.

6. A reaction product of a polyamide resin intermediate and an epoxy resin according to claim 5, which has a number-average molecular weight of 10,000 or above and a weight-average molecular weight of 1,000,000 or less.

7. A film comprising the reaction product of a polyamide resin intermediate and an epoxy resin set forth in claim 5.

TABLE 1

|  |  | Example 1 | Example 2 | Example 3 | Example 4 | Example 5 | Comparative Example |
|---|---|---|---|---|---|---|---|
| Molecular weight | Mn | 14500 | 21400 | 23300 | 18800 | 12100 | 6000 |
|  | Mw | 49100 | 821000 | 56700 | 61500 | 30200 | 8400 |
|  | Mw/Mn | 3.4 | 38.4 | 2.4 | 3.3 | 2.5 | 1.4 |
| Heat resistance | Td | 380° C. | 365° C. | 390° C. | 395° C. | 387° C. | 350° C. |
| Flexibility | n | >10 | >10 | >10 | >10 | >10 | 3 |

As is seen from the above results, the epoxy-modified polyamide resin compositions obtained according to the process of the present invention have a remarkably high level of molecular weight that could never be expected from the comparative product, therefore the epoxy-modified polyamide resin films produced from said compositions show very excellent flexibility never obtainable with the comparative product.

8. A process for preparing a reaction product of a polyamide resin intermediate and an epoxy resin according to claim 1, wherein the component (B) is a mixture of an aliphatic dicarboxylic acid and an aromatic tricarboxylic anhydride.

9. A process for preparing a reaction product of a polyamide resin intermediate and an epoxy resin according to claim 1, wherein the component (B) is a mixture of an aliphatic dicarboxylic acid and an aromatic dicarboxylic acid.

10. A process for preparing a reaction product of a polyamide resin intermediate and an epoxy resin according to claim 1, wherein the epoxy resin (C) is an aromatic glycidyl ether or an aliphatic glycidyl ether.

11. A process for preparing a reaction product of a polyamide resin intermediate and an epoxy resin according to claim 1, wherein the aromatic diisocyanate is 4,4'-diphenylmethane diisocyanate.

12. A process for preparing a reaction product of a polyamide resin intermediate and an epoxy resin according to claim 2, wherein the aliphatic dicarboxylic acid is a mixture of adipic acid, sebacic acid and dodecanedioic acid.

13. A process for preparing a reaction product of a polyamide resin intermediate and an epoxy resin according to claim 3, wherein the aliphatic dicarboxylic acid is a mixture of adipic acid and sebacic acid; the aromatic dicarboxylic acid is isophthalic acid; and the aromatic tricarboxylic anhydride is trimellitic anhydride.

14. A process for preparing a reaction product of a polyimide resin intermediate and an epoxy resin according to claim 9, wherein the aliphatic dicarboxylic acid is a mixture of adipic acid and sebacic acid; and the aromatic dicarboxylic acid is isophthalic acid.

15. A process for preparing a reaction product of a polyamide resin intermediate and an epoxy resin according to claim 10, wherein the aromatic glycidyl ether is 4,4'-isopropylidene bisphenol diglycidyl ether.

16. A process for preparing a reaction product of a polyamide resin intermediate and an epoxy resin according to claim 1, wherein the reaction of the aromatic diisocyanate (A) with the at least one member (B) is carried out at a temperature in the range of 80°–250° C. and the reaction of polyamide resin intermediate with the epoxy resin (C) is carried out at a temperature in the range of 50°–250° C.

17. A process for preparing a reaction product of a polyamide resin intermediate and an epoxy resin according to claim 16, wherein reaction of the polyamide resin intermediate with the epoxy resin (C) is carried out at the same temperature as the temperature used for the reaction of the aromatic diisocyanate with the at least one member (B).

18. A process for preparing a reaction product of a polyamide resin intermediate and an epoxy resin according to claim 16, wherein the amount of the nitrogen-containing aprotic solvent used for the reaction between the aromatic diisocyanate and the at least one member (B) is from 50 to 2000 parts by weight to 100 parts by weight of the total of (A) and (B).

19. A process for preparing a reaction product of a polyamide resin intermediate and an epoxy resin according to claim 18, wherein the epoxy resin (C) is dissolved in the nitrogen-containing aprotic solvent and then introduced into the reactor.

20. A process for preparing a reaction product of a polyamide resin intermediate and an epoxy resin, which comprises reacting (A) an aromatic diisocyanate with (B) a mixture of aliphatic dicarboxylic acids in a nitrogen-containing aprotic solvent to form a solution of polyamide resin intermediate in a reactor, and reacting said polyamide resin intermediate with (C) an epoxy resin using the same nitrogen-containing aprotic solvent in the same reactor.

21. A process for preparing a reaction product of a polyamide resin intermediate and an epoxy resin according to claim 20, wherein the mixture of aliphatic dicarboxylic acids is a mixture of adipic acid, sebacic acid and dodecanedioic acid.

22. A reaction product of a polyamide resin intermediate and an epoxy resin obtained by the process of claim 20.

23. A process for preparing a reaction product of a polyamide resin intermediate and an epoxy resin, which comprises reacting (A) an aromatic diisocyanate with (B) a mixture of at least one aliphatic dicarboxylic acid and an aromatic dicarboxylic acid, and an aromatic tricarboxylic anhydride in a nitrogen-containing aprotic solvent to form a solution of polyamide resin intermediate in a reactor, and reacting said polyamide resin intermediate with (C) an epoxy resin using the same nitrogen-containing aprotic solvent in the same reactor.

24. A process for preparing a reaction product of a polyamide resin intermediate and an epoxy resin according to claim 23, wherein the aliphatic dicarboxylic acid is a mixture of adipic and sebacic acid; the aromatic dicarboxylic acid is isophthalic acid; and the aromatic tricarboxylic anhydride is trimellitic anhydride.

25. A reaction product of a polyamide resin intermediate and an epoxy resin obtained by the process of claim 23.

26. A process for preparing a reaction product of a polyamide resin intermediate and an epoxy resin according to claim 19, wherein the epoxy resin (C) is an aromatic glycidyl ether or an aliphatic glycidyl ether.

27. A process for preparing a reaction product of a polyamide resin intermediate and an epoxy resin according to claim 26, wherein the aromatic diisocyanate is 4,4'-diphenylmethane diisocyanate.

28. A reaction product of a polyamide resin intermediate and an epoxy resin obtained by the process of claim 26.

* * * * *